United States Patent
Hong et al.

(10) Patent No.: US 10,062,954 B2
(45) Date of Patent: Aug. 28, 2018

(54) AUXILIARY APPARATUS FOR ELECTRONIC DEVICE INCLUDING ANTENNA

(71) Applicant: Samsung Electronics Co., Ltd., Suwon-si, Gyeonggi-do (KR)

(72) Inventors: Won-Bin Hong, Seoul (KR); Jun-Sig Kum, Yongin-si (KR); Young-Ju Lee, Seoul (KR); Jung-Yub Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 15/302,385

(22) PCT Filed: Apr. 7, 2015

(86) PCT No.: PCT/KR2015/003468
§ 371 (c)(1),
(2) Date: Oct. 6, 2016

(87) PCT Pub. No.: WO2015/156577
PCT Pub. Date: Oct. 15, 2015

(65) Prior Publication Data
US 2017/0033434 A1     Feb. 2, 2017

(30) Foreign Application Priority Data

Apr. 7, 2014 (KR) .................. 10-2014-0041193
Apr. 6, 2015 (KR) .................. 10-2015-0048642

(51) Int. Cl.
*H01Q 1/24* (2006.01)
*H01Q 1/22* (2006.01)
(Continued)

(52) U.S. Cl.
CPC .............. *H01Q 1/22* (2013.01); *H01Q 1/084* (2013.01); *H01Q 1/243* (2013.01); *H01Q 1/42* (2013.01);
(Continued)

(58) Field of Classification Search
CPC ............. H01Q 1/42; H01Q 1/243; H01Q 1/22
See application file for complete search history.

(56) References Cited

U.S. PATENT DOCUMENTS

2006/0118625 A1   6/2006  Sekita
2008/0161076 A1   7/2008  Min et al.
(Continued)

FOREIGN PATENT DOCUMENTS

JP         2006165805 A    6/2006
JP     10-2008-0057599 A   6/2008
(Continued)

*Primary Examiner* — Graham Smith
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present invention relates to an assist device for an electronic device including an antenna, wherein the assist device includes a second unit including a second antenna, wherein the second antenna configured to generate capacitance with at least one of a first antenna in a first unit and an internal antenna of the electronic device. Further, the present invention also includes embodiments different from the above-described embodiment.

20 Claims, 20 Drawing Sheets

(51) Int. Cl.
 *H01Q 5/321* (2015.01)
 *H01Q 5/371* (2015.01)
 *H01Q 1/08* (2006.01)
 *H01Q 1/42* (2006.01)
 *H04B 1/3888* (2015.01)

(52) U.S. Cl.
 CPC ............ *H01Q 5/321* (2015.01); *H01Q 5/371* (2015.01); *H04B 1/3888* (2013.01)

(56) References Cited

U.S. PATENT DOCUMENTS

| | | |
|---|---|---|
| 2009/0033562 A1 | 2/2009 | Takeuchi et al. |
| 2009/0085696 A1 | 4/2009 | Abdul-Gaffoor et al. |
| 2009/0140936 A1 | 6/2009 | Cho et al. |
| 2012/0001822 A1 | 1/2012 | Liu et al. |
| 2012/0056789 A1 | 3/2012 | Sohn |
| 2012/0206303 A1* | 8/2012 | Desclos ................ H01Q 1/243 343/702 |
| 2012/0262347 A1 | 10/2012 | Tiang |
| 2013/0102367 A1 | 4/2013 | Kong |
| 2013/0135158 A1 | 5/2013 | Faraone et al. |
| 2013/0260675 A1 | 10/2013 | Chan et al. |

FOREIGN PATENT DOCUMENTS

| | | |
|---|---|---|
| JP | 10-2008-0062626 A | 7/2008 |
| JP | 2012015815 A | 1/2012 |
| KR | 10-2008-0057599 A | 6/2008 |
| KR | 10-2008-0062626 A | 7/2008 |

\* cited by examiner

AUXILIARY APPARATUS FOR ELECTRONIC DEVICE INCLUDING ANTENNA

FIELD OF THE INVENTION

The present invention relates to an assist device that is used for an electronic device having an antenna.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Also, in modern society, electronic devices are used for various communications. Further, the growth of communication technologies results in the implementation of wireless communication based services in various electronic devices. In accordance with this, the kind of electronic devices including antennas for wireless communication is being gradually diversified. Physical space securing is essential for antenna performance securing. Generally, the antennas have the maximum performance at a size of $\lambda/2$ or $\lambda/4$. The $\lambda$ means a wavelength at an operation frequency. However, in some cases, the size of the antenna is designed much smaller than the wavelength. Generally, the antenna of the size much smaller than the wavelength is called a 'small antenna'. At this time, the performance of the small antenna is proportional to a size of the antenna.

In case where a communication band is within a range of 700 MHz to 3000 MHz, the 700 MHz being a low band frequency has a wavelength of about 40 cm. For example, in case where a communication band of a portable terminal (e.g., a smart phone) is the 700 MHz, a space to install the antenna of the 40 cm size is not permitted. Accordingly, in a case of the low band, an antenna built in the portable terminal corresponds to a small antenna. Recently, portable terminals are on the trend of thickness decrease, screen increase, bezel decrease, etc. and accordingly to this, a space capable of mounting antennas is gradually decreasing. Furthermore, owing to the multi-functionality of the portable terminals, the number of parts mounted therein increases, and the securing of the space for mounting the antennas is getting more difficult.

DETAILED DESCRIPTION OF THE INVENTION

Technological Problem

One exemplary embodiment of the present invention provides an apparatus for increasing antenna efficiency.

Another exemplary embodiment of the present invention provides an apparatus including an additional antenna that has influence on a characteristic of an internal antenna of an electronic device.

A further exemplary embodiment of the present invention provides an apparatus for changing a resonance frequency of an internal antenna of an electronic device.

A yet another exemplary embodiment of the present invention provides an apparatus having different influence on an internal antenna of an electronic device in accordance with a usage status.

A still another exemplary embodiment of the present invention provides an apparatus for improving a data transmission rate through antenna performance improvement.

A still another exemplary embodiment of the present invention provides an apparatus for improving a broadcasting signal reception rate through antenna performance improvement.

Means for Solving Problem

An assist device for an electronic device having an antenna according to an exemplary embodiment of the present invention, includes a second unit including a second antenna, and the second antenna is configured to generate capacitance with at least one of a first antenna in a first unit and an internal antenna of the electronic device. Here, a value of the capacitance can be varied depending on a relative position relationship between the first unit and the second unit.

Effects of the Invention

By using for an electronic device an assist device including an antenna element according to exemplary embodiments of the present invention, the reception coverage of the electronic device increases, and effects of data transmission speed improvement, call reception performance improvement, etc. can be obtained.

BEST MODE FOR EMBODIMENT OF THE INVENTION

The operation principle of the present invention is described below in detail with reference to the accompanying drawings. In describing the present invention below, a detailed description of related well-known functions or constructions will be omitted if it is determined that a detailed description thereof may unnecessarily obscure the gist of the present invention. And, the terms described later, terms defined considering functions in the present invention, can be modified in accordance to user and/or operator's intention or practice, etc. Therefore, the definition should be given on the basis of content throughout the present specification.

Below, the present invention describes a technology for improving the antenna performance of an electronic device including an antenna by means of an assist device.

The terms, etc. for identifying components of an electronic device and an assist device used in the following description are for description convenience. Accordingly, the present invention is not limited to the terms described later, and can use other terms denoting objects having an equivalent technological meaning.

In the present invention, the electronic device can be a portable electronic device, and can be one of a smart phone, a portable terminal, a mobile phone, a mobile pad, a media player, a tablet computer, a handheld computer or a Personal Digital Assistant (PDA). Also, the electronic device can be a device combining two or more functions among the aforementioned devices.

An intuitive method for improving the antenna performance of an electronic device is to install an antenna outside the electronic device, thereby securing a relatively wide space for antenna installation. For example, a method of making an exterior of the electronic device from a metal frame and using the exterior as an antenna, a method of inserting an antenna pattern into a rear case of an antenna, a method of installing an antenna in a bumper case that is one of additional accessories, etc. can be taken into consideration.

Figure 1:
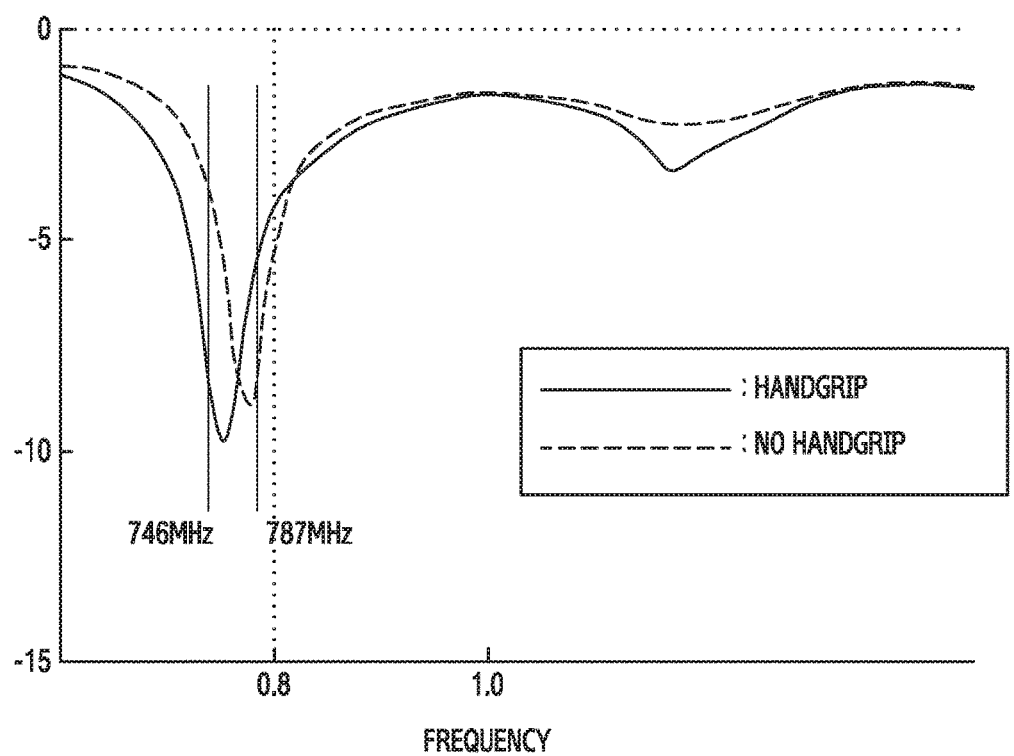
FIG. 1 illustrates an example of a variation of antenna performance caused by a handgrip in an electronic device.

Or, an idea of additionally installing an external antenna physically coupled with an internal antenna of an electronic device, thereby extending an antenna space is available. But, the extension through the physical coupling may cause the following problems. A separate fastening terminal for physical coupling between the internal antenna and the external antenna is required. Owing to a structure of the electronic device, an installation position of the external antenna can be fixed to a specific range. For example, the installation position can include a rear case, a bumper case, a protection case, a protection film, etc. Also, because antenna space extension is restrictive, antenna performance improvement is restrictive as well. Further, in a case of a portable terminal (e.g., a smart phone), in a calling status, the influence of a user's handgrip can result in a deterioration of antenna performance. One example of the performance deterioration caused by the handgrip is given as in FIG. 1 below. FIG. 1 illustrates an example of a variation of antenna performance caused by a handgrip in an electronic device. FIG. 1 represents a reflection coefficient dependent on a frequency. Referring to FIG. 1, it is checked that a frequency at which the reflection coefficient is minimal, i.e., a resonance frequency is varied depending on handgrip or non-handgrip.

Accordingly, various exemplary embodiments of the present invention propose a way of improving antenna performance while avoiding influence from the human body. For the sake of this, new antenna space setting is required, and various exemplary embodiments of the present invention provide an assist device used for an electronic device.

Figure 2:
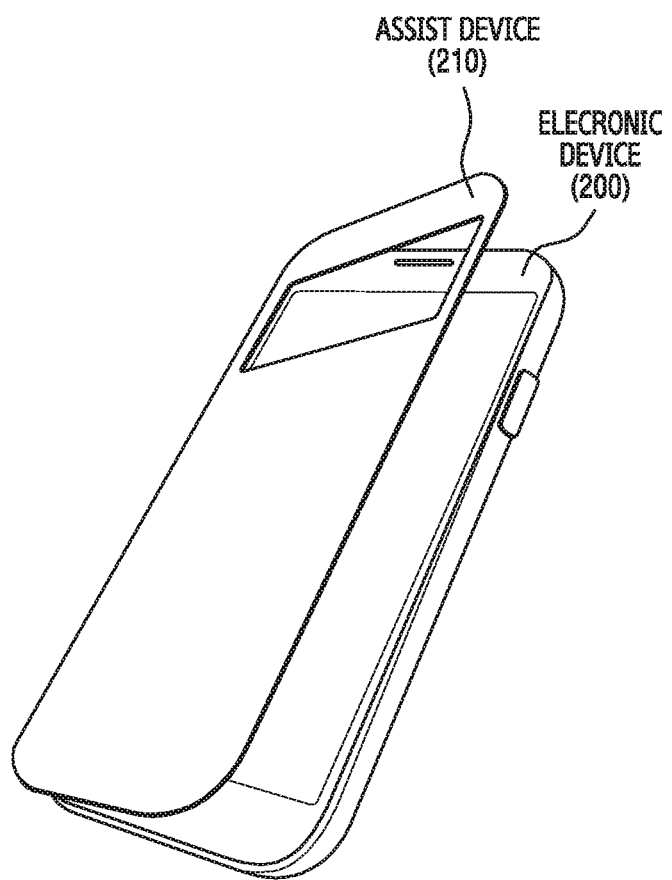
FIG. 2 illustrates an example of an electronic device and an assist device according to an exemplary embodiment of the present invention.

FIG. 2 illustrates an example of an electronic device and an assist device according to an exemplary embodiment of the present invention.

Referring to FIG. 2, the assist device 210 can be physically attached to the electronic device 220. In FIG. 2, the electronic device 220 is a portable terminal such as a smart phone, and the assist device 210 is a cover for the electronic device 220. The assist device 210 can be denoted as a cover, a flip cover, a view cover, etc. The assist device 210, a structure independent from the electronic device 220, can be attached to an exterior of the electronic device 220. Or, the assist device 210 can be coupled with a part of a component of the electronic device 220. For example, the assist device 210 can include the entire of a rear cover of the electronic device 220 or a part thereof. In this case, if the assist device 210 is eliminated, even the rear cover of the electronic device 220 is eliminated together. In FIG. 2, a hole is provided in a part of the assist device 210, but the hole may not exist.

Figure 3:
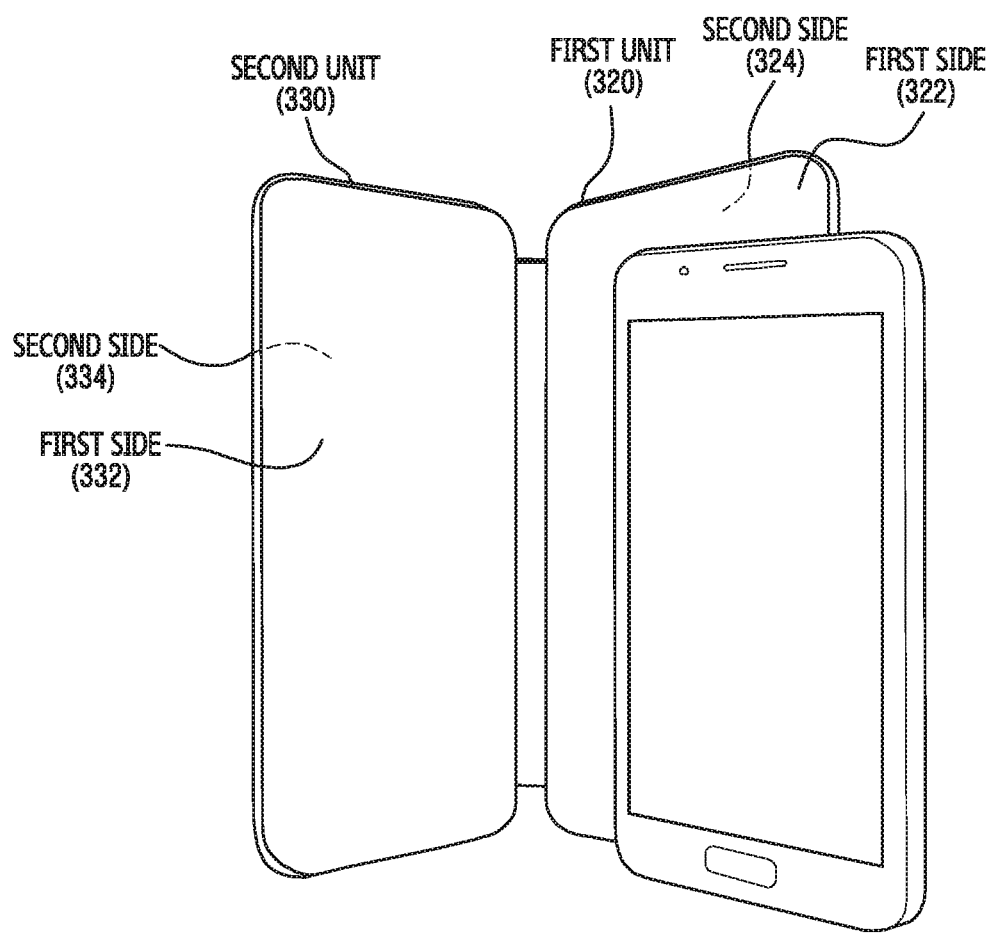
FIG. 3 illustrates an example of components of an assist device according to an exemplary embodiment of the present invention.

FIG. 3 illustrates an example of components of an assist device according to an exemplary embodiment of the present invention.

Referring to FIG. 3, the assist device consists of a first unit 320 and a second unit 330. The first unit 320, a component of the assist device attached to the electronic device, can be a structure that includes a part of a component (e.g., a rear cover) of the electronic device or is independent from the electronic device. That is, so long as the assist device is not eliminated, a relative position relationship between the first unit 320 and the electronic device is not changed. The first unit 320 includes a first side 322 and a second side 324. The first side 322, a side getting in contact with a rear side of the electronic device, can be denoted as an inner side. The second side 324, a side opposite to the first side 322, can be denoted as an outer side.

The second unit 330 is a structure independent from the electronic device. The second unit 330 includes a first side 332 and a second side 334. The first side 332, a side getting in contact with a front side of the electronic device, can be denoted as an inner side. The second side 334, a side opposite to the first side 332, can be denoted as an outer side. The first unit 320 and the second unit 330 are mutually coupled with each other by means of materials having ductility or are coupled with each other through a hinge, whereby a relative position relationship between the second unit 330 and the electronic device can be changed. In accordance with this, the assist device can be in an open status, a close status, and/or a folding status. The statuses of the assist device can be defined as in FIGS. 4A to 4C below.

Figure 4A:
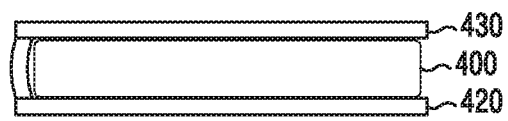
FIGS. 4A to 4C illustrate a status variation of an assist device according to an exemplary embodiment of the present invention.
Figure 4B:
Figure 4C:
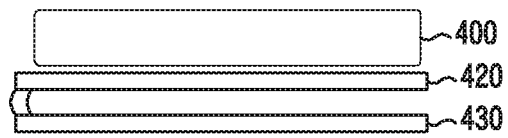

FIGS. 4A to 4C illustrate a status variation of an assist device according to an exemplary embodiment of the present invention. FIG. 4A illustrates a close status, FIG. 4B illustrates an open status, and FIG. 4C illustrates a folding status.

Referring to FIG. 4A, the close status is a status in which a first unit 420 and a second unit 430 are arranged substantially parallel to each other, and is a status in which the second unit 430 covers a front side of an electronic device 400. That is, the close status is a status in which a first side, i.e., an inner side of the second unit 430 and the electronic device 400 are in contact with each other. In the close status, an outer side of the first unit 420 and an outer side of the second unit 430 are exposed. Also, in the close status, the front side of the electronic device 400 is not exposed.

Referring to FIG. 4B, the open status is a status in which the second unit 430 and the first unit 420 are arranged substantially side by side. In the open status, the outer side of the first unit 420 is exposed, and the inner side of the second unit 430 and the outer side thereof are exposed. Also, in the open status, the front side of the electronic device 400 is exposed.

Referring to FIG. 4C, the folding status is a status in which the second unit 430 and the first unit 420 are arranged substantially parallel to each other, and is a status in which the outer side of the second unit 430 and the outer side of the first unit 420 face each other. In the folding status, the inner side of the second unit 430 is exposed. Also, in the folding status, the front side of the electronic device 400 is exposed.

Figure 5:
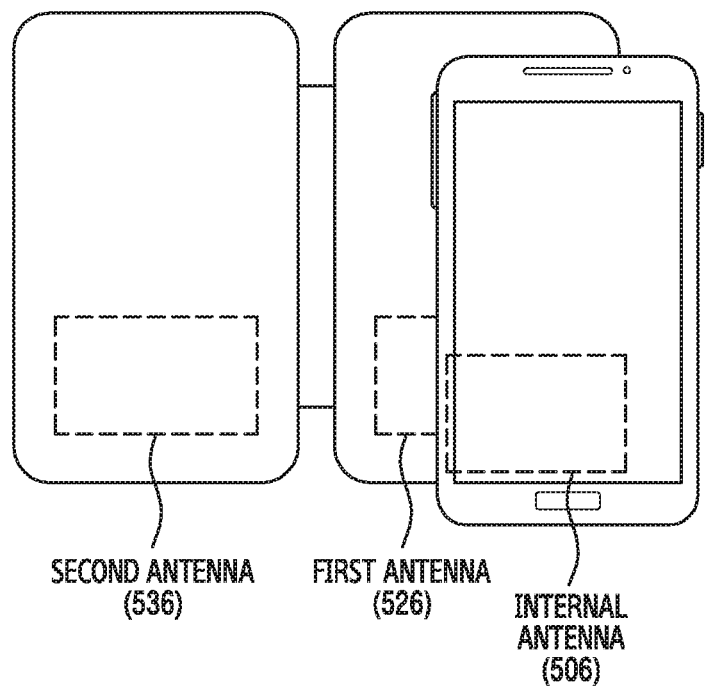
FIG. 5 illustrates an antenna structure of an assist device according to an exemplary embodiment of the present invention.

FIG. 5 illustrates an antenna structure of an assist device according to an exemplary embodiment of the present invention.

Referring to FIG. 5, an electronic device includes an internal antenna 506, and the assist device includes a first antenna 526 and a second antenna 536. In other words, the assist device according to an exemplary embodiment of the present invention can include at least one antenna. The antenna represents a conductive structure having a specific pattern that is designed for signal radiation or for helping the signal radiation. The first antenna 526 and the second antenna 536 which are included in the assist device can be called a 'cover antenna'.

The first antenna 526, a main radiator of the cover antenna, includes a feeding part for capacitive coupling with the internal antenna 506. That is, the first antenna 526 is capacitively coupled with the internal antenna 506. The second antenna 536 is a means for changing an antenna characteristic depending on a status of the assist device. Here, the status includes an open status, a close status, and/or a folding status.

In the example of FIG. 5, the internal antenna 506, the first antenna 526, and/or the second antenna 527 are positioned at lower ends of the electronic device and the assist device. But, the positions of the internal antenna 506, the first antenna 526, and/or the second antenna 527 are one example, and can be arranged in different positions. However, the positions of the first antenna 526 and the second antenna 527 can depend on the position of the internal antenna 506.

Also, in the example of FIG. 5, antenna patterns of the internal antenna 506, the first antenna 526, and/or the second antenna 527 are omitted. Concrete antenna patterns of the internal antenna 506, the first antenna 526, and/or the second antenna 536 can be different from one another on the basis of a signal band, an antenna type, a characteristic of the electronic device, desired capacitance, etc.

In accordance with one exemplary embodiment of the present invention, the cover antenna can be included within the assist device. In this case, the cover antenna is installed at a time the assist device is manufactured. In accordance with another exemplary embodiment of the present invention, the cover antenna can be installed in an ex post manner by a user. For example, the cover antenna can be installed in the assist device in a form of being attached to the assist device through an adhesive, in other words, in a form of a sticker. In this case, the cover antenna can be attached to the assist device in a form of an antenna pattern printed on a non-conductive film, or can be attached to the assist device in a form of only the antenna pattern.

Figure 6A:
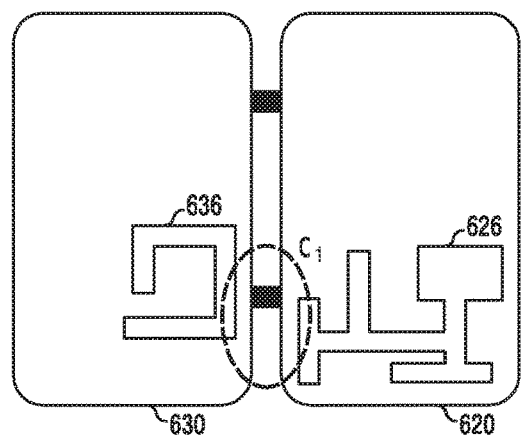
FIGS. 6A to 6C illustrate a capacitance variation dependent on a status of an assist device according to an exemplary embodiment of the present invention.
Figure 6B:
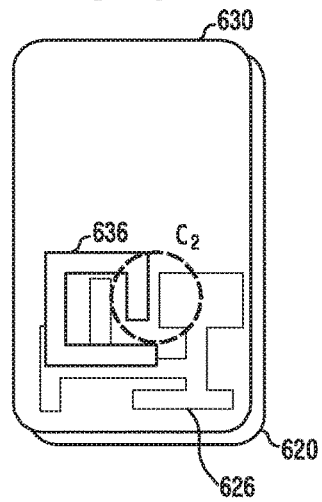
Figure 6C:
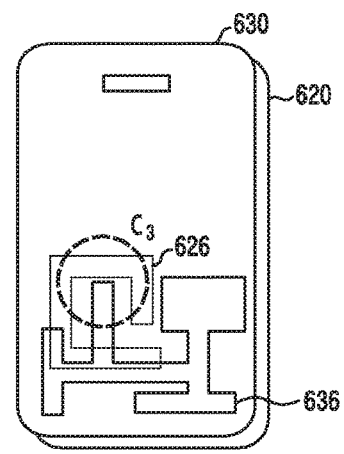

FIGS. 6A to 6C illustrate a capacitance variation dependent on a status of an assist device according to an exemplary embodiment of the present invention. FIG. 6A illustrates an open status, FIG. 6B illustrates a close status, and FIG. 6C illustrates a folding status. FIG. 6 illustrates concrete antenna patterns, but the illustrated antenna patterns are one example and the present invention is not limited to this.

Referring to FIGS. 6A to 6C, capacitance is generated between a first antenna 626 included in a first unit 620 and a second antenna 636 included in a second unit 630. However, capacitance of a different level is generated depending on the status of the assist device. In detail, capacitance of a level $C_1$ can be generated in the open status of FIG. 6A, capacitance of a level $C_2$ can be generated in the close status of FIG. 6B, and capacitance of a level $C_3$ can be generated in the folding status of FIG. 6C. Concrete values of the C1, the C2, and/or the C3 are determined on the basis of characteristics such as shapes of the first antenna 626 and the second antenna 636, areas thereof, a relative position relationship therebetween, fragmented structures thereof, etc. Accordingly, the characteristics such as the shapes of the first antenna 626 and the second antenna 636, the areas thereof, the relative position relationship therebetween, etc. are design variables that can be varied depending on antenna performance intended and targeted by an executor of the present invention.

Figure 7:
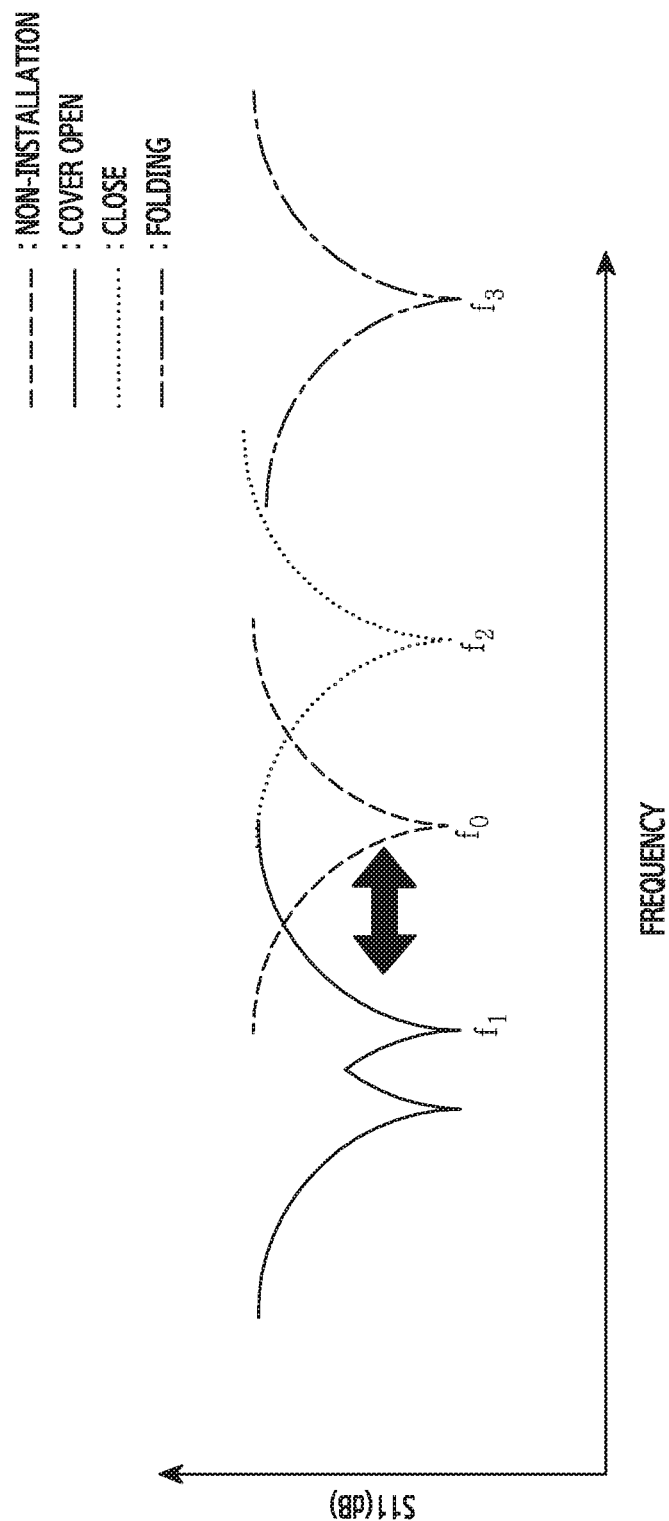
FIG. 7 illustrates an example of an antenna characteristic variation dependent on a status of an assist device according to an exemplary embodiment of the present invention.

FIG. 7 illustrates an example of an antenna characteristic variation dependent on a status of an assist device according to an exemplary embodiment of the present invention. FIG. 7 illustrates a characteristic of the entire antenna that includes all of an internal antenna of an electronic device and a first antenna and second antenna of the assist device. FIG. 7 represents a reflection coefficient dependent on a frequency variation. A frequency at which the reflection coefficient is minimal is a resonance frequency.

A frequency characteristic illustrated in FIG. 7 is a characteristic of an antenna itself, in detail, a characteristic that does not consider the influence of other components (e.g., dielectric substance excepting an antenna pattern) of the assist device dependent on a usage status of the assist device and/or the influence of a user's handgrip. That is, a variation of the frequency characteristic illustrated in FIG. 7 is for compensating an antenna characteristic variation caused by either the other components of the assist device or the handgrip.

Referring to FIG. 7, a resonance frequency is varied depending on an open status, close status, and/or folding status of the assist device. In detail, when the assist device is not installed, the resonance frequency is $f_0$ and, when the assist device is in the open status, the resonance frequency is decreased to $f_1$. In contrast, when the assist device is in the close status or the folding status, the resonance frequency is increased to $f_2$ or $f_3$. Accordingly, in a case of the open status, if a resonance frequency increases by $f_0$-$f_1$ due to an external factor, the influence of the external factor can be compensated through the frequency characteristic variation of FIG. 7. Also, in a case of the close status, if the resonance frequency decreases by $f_2$-$f_0$ due to an external factor, the influence of the external factor can be compensated through the frequency characteristic variation of FIG. 7. Also, in a case of the folding status, if the resonance frequency decreases by $f_3$-$f_0$ due to an external factor, the influence of the external factor can be compensated through the frequency characteristic variation of FIG. 7.

Referring to the frequency characteristic variation exemplified in FIG. 7, the resonance frequency of the antenna itself is decreased in the open status, and the resonance frequency of the antenna itself is increased in the close statue or the folding status. That is, the example of FIG. 7 is on the presumption that a resonance frequency is increased due to the external factor in the open status, and the resonance frequency is decreased due to the external factor in the close status or the folding status. But, if the resonance frequency is decreased due to the external factor in the open status, unlike the example of FIG. 7, the assist device can be designed such that the resonance frequency of the antenna itself is increased in the open status. Also, if the resonance frequency is increased due to the external factor in the close status or the folding status, unlike the example of FIG. 7, the assist device can be designed such that the resonance frequency of the antenna itself is decreased in the close status or the folding status. That is, the resonance frequency variation dependent on the status of the assist device can be different in accordance with various exemplary embodiments of the present invention.

Figure 8:
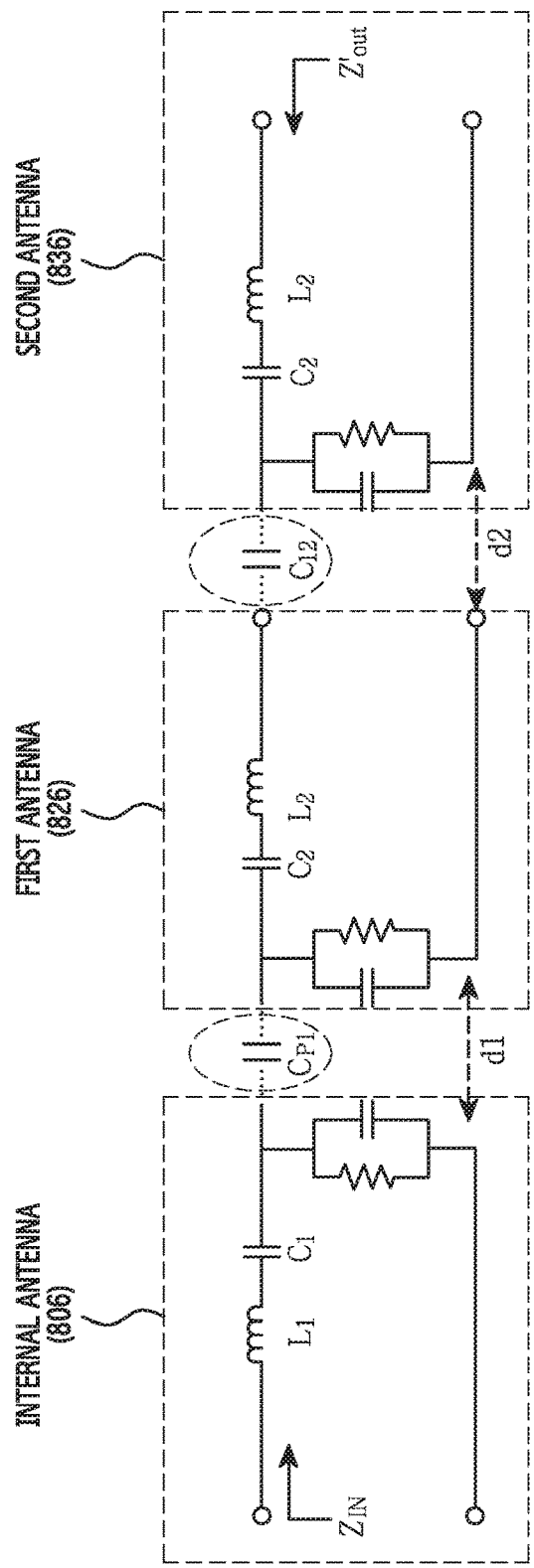
FIG. 8 illustrates an equivalent circuit of antennas included in an assist device and an electronic device according to an exemplary embodiment of the present invention.

FIG. 8 illustrates an equivalent circuit of antennas included in an assist device and an electronic device according to an exemplary embodiment of the present invention.

Referring to FIG. 8, an internal antenna 806, a first antenna 826, and/or a second antenna 836 are capacitively coupled with one another. $C_{P1}$ between the internal antenna 806 and the first antenna 826 is a parasitic capacitance value generated between antenna patterns physically isolated from each other. The $C_{P1}$ is not changed depending on a status of the assist device. $C_{12}$ between the first antenna 826 and the second antenna 836 is a capacitance value generated between antenna patterns physically isolated from each other, and can be changed depending on the status of the assist device. As one antenna, the internal antenna 806, the first antenna 826, and/or the second antenna 836 can radiate a signal. In an open status, a total capacitance of the antennas is given as in Equation 1 below.

$$C_{total} = \frac{1}{\frac{1}{C_1} + \frac{1}{C_2} + \frac{1}{C_{P1}}} \quad (1)$$

In Equation 1, the '$C_{total}$' denotes a total capacitance of antennas, the '$C_1$' denotes capacitance of an internal antenna of an electronic device, the '$C_2$' denotes capacitance of a first antenna of an assist device, and the '$C_{P1}$' denotes parasitic capacitance between the internal antenna and the first antenna.

Referring to Equation 1, the second antenna 836 does not have influence on the total capacitance $C_{total}$. That is, in the open status, the second antenna 836 is the same as not being coupled. At this time, a resonance frequency $f_r$ is given as Equation 2 below.

$$f_r = \frac{1}{\sqrt{L_{tot} C_{tot}}} \quad (2)$$

In Equation 2, the '$f_r$' denotes a resonance frequency, the '$L_{tot}$' denotes total inductance, and the '$C_{tot}$' denotes total capacitance.

A relationship between the parasitic capacitance $C_{P1}$ and other variables is given as in Equation 3 below.

$$C_{P1} \propto \frac{\varepsilon_r a}{d} \quad \Delta C_P \propto f_r \quad (3)$$

In Equation 3, the '$C_{P1}$' denotes parasitic capacitance between the internal antenna and the first antenna, the '$\varepsilon_r$' denotes a permittivity of the assist device, the 'a' denotes an overlapped area overlapped between the internal antenna and the first antenna, the 'd' denotes a distance between the internal antenna and the first antenna, and the '$f_r$' denotes a resonance frequency.

The equivalent circuit of the antennas illustrated in FIG. 8 is one example. Accordingly, the antennas according to an exemplary embodiment of the present invention can be implemented in other structures. For example, the antennas can be substituted with antennas of a scheme illustrated in FIGS. 9A to 9C below.

Figure 9A:
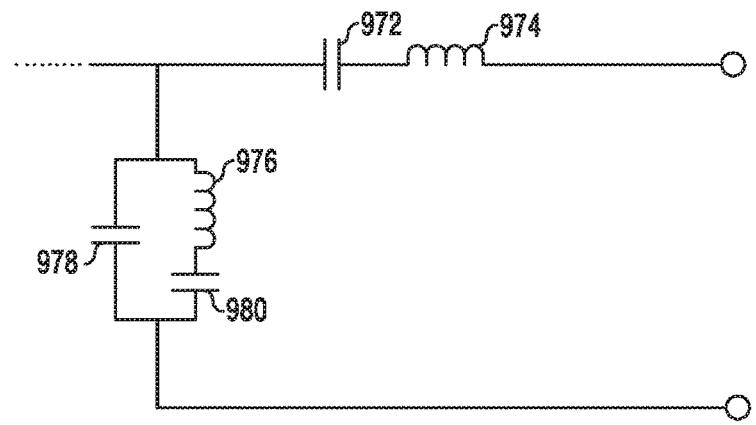
FIGS. 9A to 9C illustrate an example of substitutable structures of antennas included in an assist device according to an exemplary embodiment of the present invention.
Figure 9B:
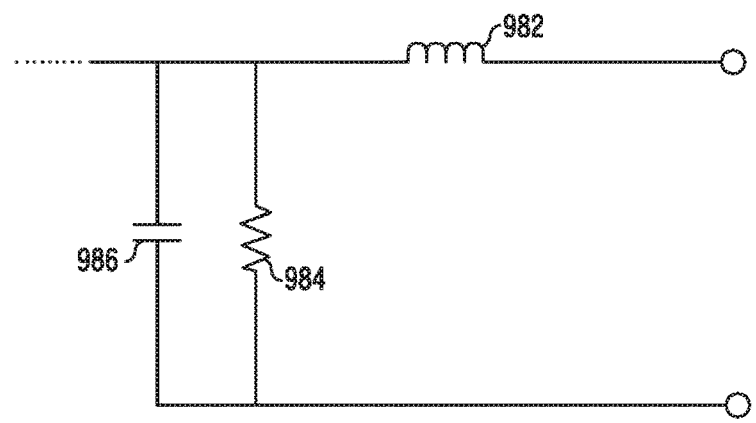
Figure 9C:
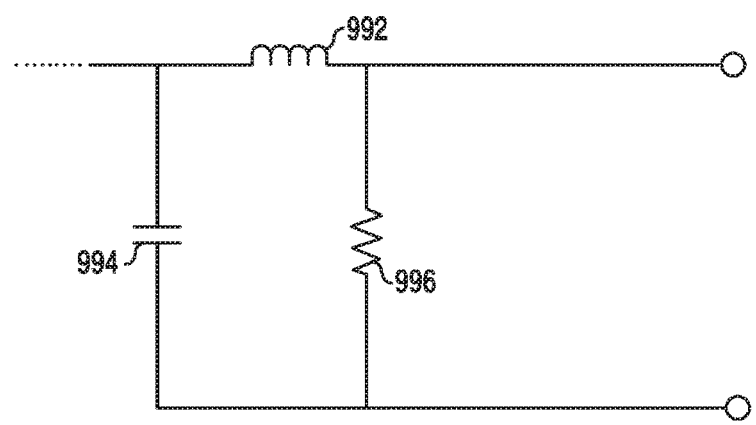

FIGS. 9A to 9C illustrate an example of substitutable structures of antennas included in an assist device according to an exemplary embodiment of the present invention. The equivalent circuit of the respective antennas illustrated in FIG. 8 can have a CRLH structure of FIG. 9A, an RLC structure of FIG. 9B, and/or a traveling wave structure of FIG. 9C.

Referring to FIG. 9A, the CRLH structure is a structure which includes a sub-circuit including a capacitor 978 arranged in parallel with serially coupled inductor 976 and capacitor 980, and in which the sub-circuit, a capacitor 972 and an inductor 974 are serially coupled with one another. Referring to FIG. 9B, the RLC structure is a structure which includes a sub-circuit including a resistor 984 and a capacitor 986 parallel coupled with each other, and in which the sub-circuit and an inductor 982 are serially coupled with each other. Referring to FIG. 9C, the traveling wave structure is a structure which includes a sub-circuit including an inductor 992 and a resistor 996 serially coupled with each other, and in which the sub-circuit and a capacitor 994 are parallel coupled with each other.

Figure 10:
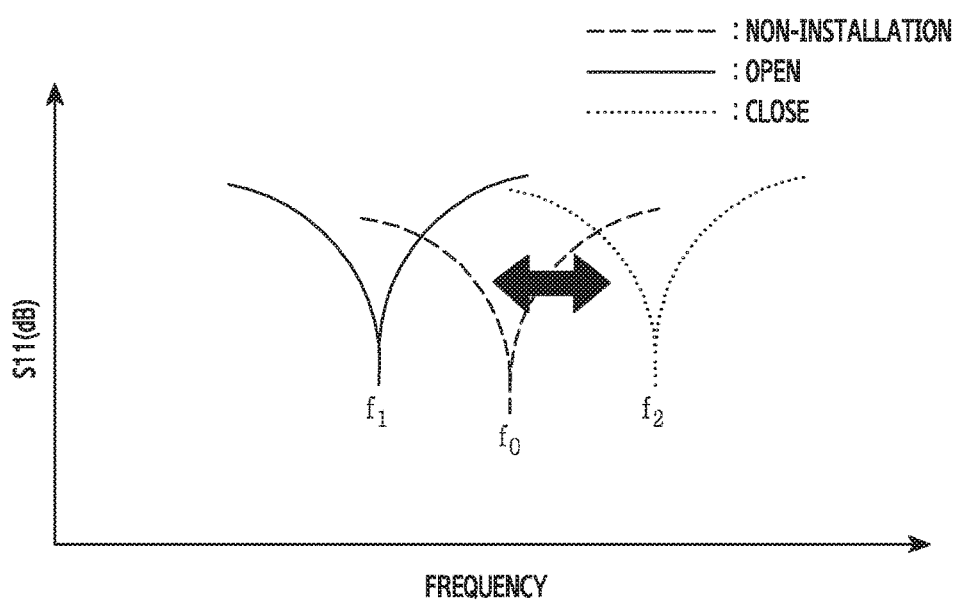
FIG. 10 illustrates an example of a variation of a resonance frequency dependent on a status variation of an assist device according to an exemplary embodiment of the present invention.

FIG. 10 illustrates an example of a variation of a resonance frequency dependent on a status variation of an assist device according to an exemplary embodiment of the present invention. FIG. 10 illustrates a characteristic of the entire antenna that includes all of an internal antenna of an electronic device and a first antenna and second antenna of the assist device. FIG. 10 represents a reflection coefficient dependent on a frequency variation. A frequency at which a reflection coefficient is minimal is a resonance frequency.

Referring to FIG. 10, a resonance frequency is $f_0$ when the assist device is not installed. The resonance frequency is decreased to $f_1$ when the assist device is in an open status. In contrast, the resonance frequency is increased to $f_2$ when the assist device is in a close status. The resonance frequency variation in the close status is caused by the generation of the $C_{12}$ between the first antenna 826 and the second antenna 836 illustrated in FIG. 8. Accordingly to this, a variation of a resonance frequency caused by an external factor can be compensated. For example, a phenomenon in which a frequency is decreased due to a user's handgrip can be corrected.

Unlike the antenna characteristic of FIG. 7, the antenna characteristic of FIG. 10 does not consider a folding status of the assist device. That is, in accordance with various exemplary embodiments of the present invention, only some of three statuses (e.g., open status, close statue, and/or folding status) of the assist device can be selectively taken into consideration. FIG. 10 exemplifies a case in which only the open status and the close status are considered.

Figure 11:
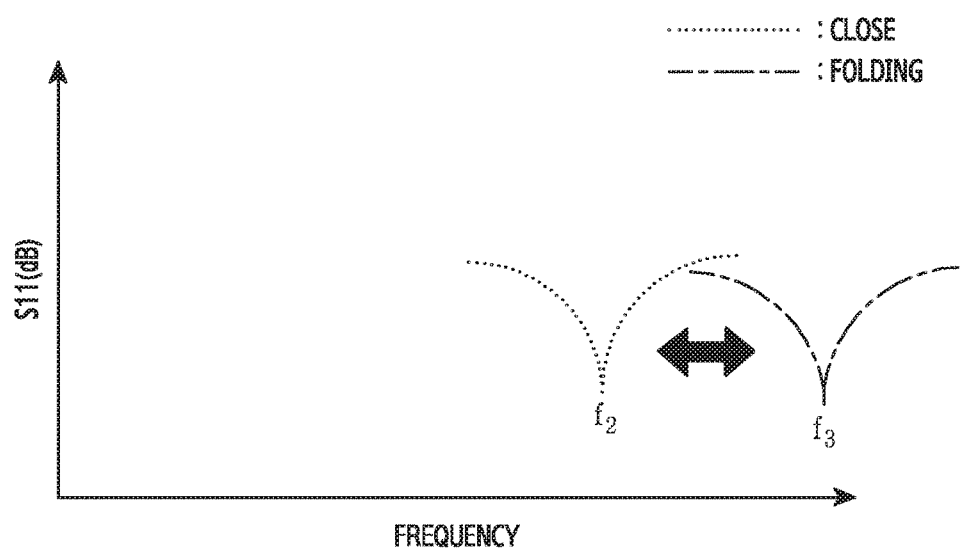
FIG. 11 illustrates another example of a variation of a resonance frequency dependent on a status variation of an assist device according to an exemplary embodiment of the present invention.

FIG. 11 illustrates another example of a variation of a resonance frequency dependent on a status variation of an assist device according to an exemplary embodiment of the present invention. FIG. 11 illustrates a characteristic of the entire antenna including all of an internal antenna of an electronic device and a first antenna and second antenna of the assist device. FIG. 11 represents a reflection coefficient dependent on a frequency variation. A frequency at which a reflection coefficient is minimal is a resonance frequency.

Referring to FIG. 11, a resonance frequency is $f_2$ when the assist device is in a close status. The resonance frequency is increased to $f_3$ when the assist device is in a folding status. The resonance frequency variation in the folding status is caused by a variation of the $C_{12}$ between the first antenna 826 and the second antenna 836 illustrated in FIG. 8. Accordingly to this, a variation of a resonance frequency caused by an external factor can be compensated. For example, a phenomenon in which a frequency is decreased due to a user's handgrip can be corrected.

Unlike the antenna characteristic of FIG. 7, an antenna characteristic of FIG. 11 does not consider an open status of the assist device. That is, in accordance with various exemplary embodiments of the present invention, only some of three statuses (e.g., open status, close statue, and/or folding status) of the assist device can be selectively taken into consideration. FIG. 11 exemplifies a case in which only the close status and the folding status are considered.

Figure 12:
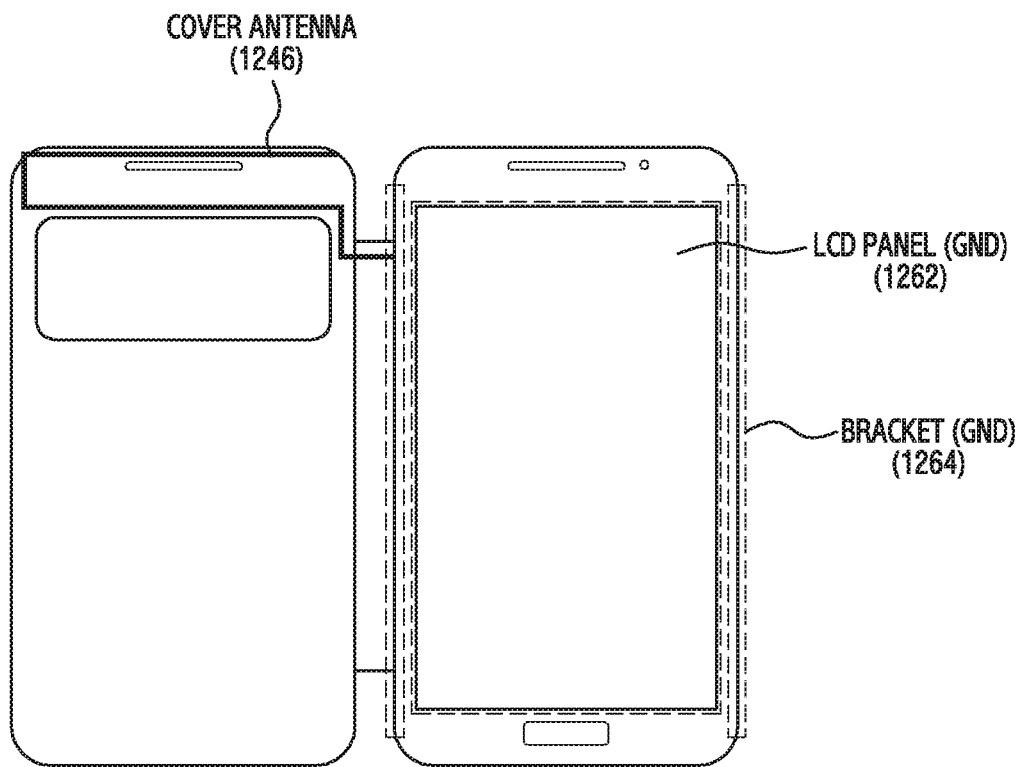
FIG. 12 illustrates an example of implementation of an assist device according to an exemplary embodiment of the present invention.

FIG. 12 illustrates an example of implementation of an assist device according to an exemplary embodiment of the present invention.

Referring to FIG. 12, the assist device includes a cover antenna 1246. A Liquid Crystal Display (LCD) panel 1262 of an electronic device and a bracket 1264 thereof correspond to the ground. The cover antenna 1246 can be installed to maximize the performance of a sub antenna of an upper end of the electronic device. A feeding part of the cover antenna 1246 of the assist device is installed getting close to a main radiator of the sub antenna built in the electronic device, and a main radiator of the cover antenna 1246 is installed at an upper end of a front part of the assist device, whereby it can be implemented to minimize performance deterioration in a close status. It is desirable that a space of about {1/10×N×wavelength} or more is secured for the sake of installation of the cover antenna 1246. Also, it is desirable that another conductor does not exist around the cover antenna 1246. In this case, the maximum performance can be expected when the cover antenna 1246 is spaced {1/2×wavelength} apart from the ground in an open status, the close status, and/or a folding status.

In a case of implementation of FIG. 12, an antenna operation band can be varied in the open status, the close status, and/or the folding status. That is, in a case of implementation considering only operating at a communication band in the open status, the antenna is resonated out of the communication band in the close status or the folding status, thereby causing performance deterioration. Accordingly, it is desirable to implement to generate an additional compensation factor (e.g., capacitance and/or inductance) in the close status and the folding status. In this case, an example of a variation of a resonance point of the antenna is given as in FIG. 13 below.

Figure 13:
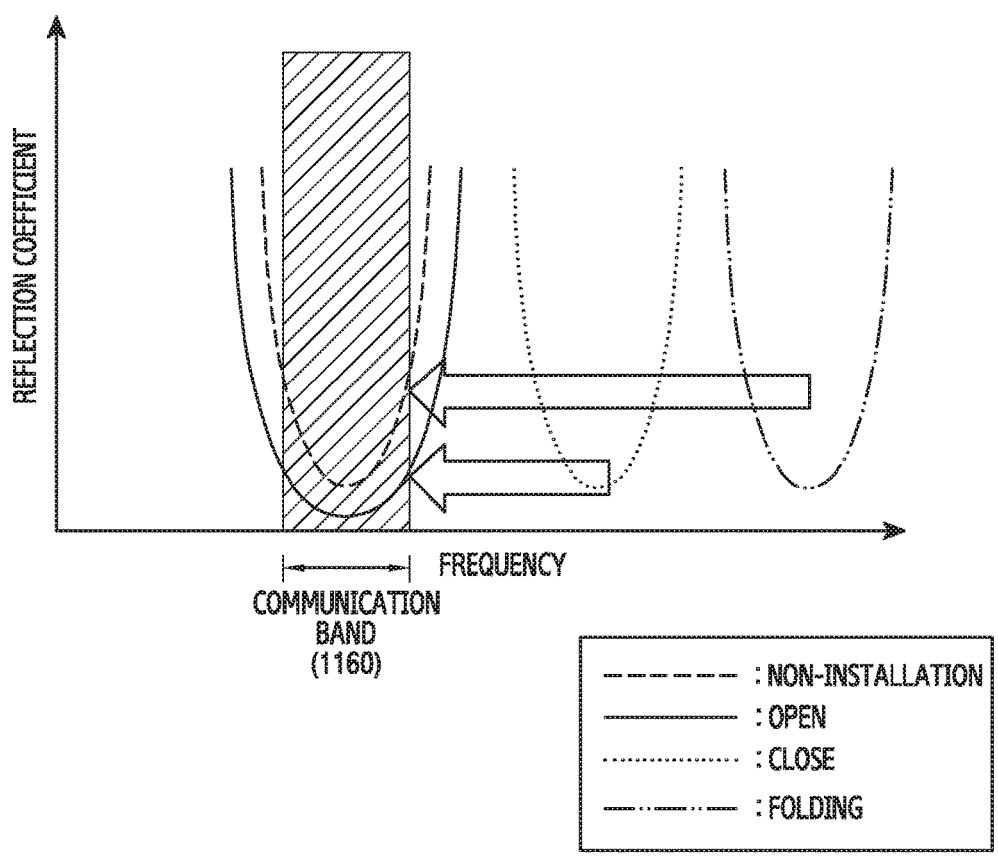
FIG. 13 illustrates an example of a variation of a resonance frequency of an antenna of an electronic device caused by an assist device according to an exemplary embodiment of the present invention.

FIG. 13 illustrates an example of a variation of a resonance frequency of an antenna of an electronic device caused by an assist device according to an exemplary embodiment of the present invention. FIG. 13 represents a reflection coefficient dependent on a frequency variation. Referring to FIG. 13, it is shown that a reflection coefficient in the open status is lower than at non-installation of the assist device. That is, it can be implemented to optimize performance in the open status. Also, the performance can be secured by implementing to form capacitance $C_{close}$ with the front ground (e.g., the LCD panel 1262 and the bracket 1264) of the electronic device in the close status and to form capacitance $C_{fold}$ with the rear ground of the electronic device in the folding status.

Figure 14A:
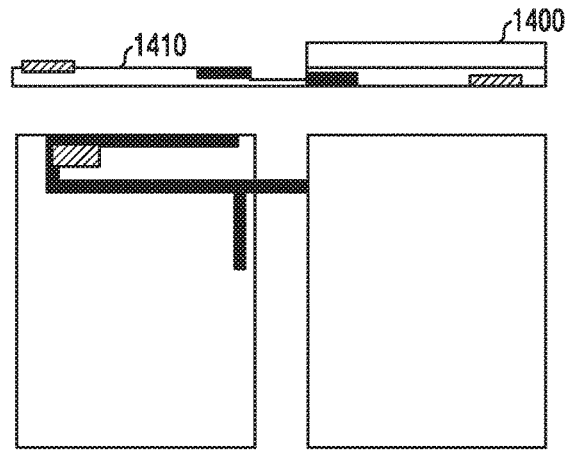
FIGS. 14A to 14C illustrate another example of implementation of an assist device according to an exemplary embodiment of the present invention.
Figure 14B:
Figure 14C:
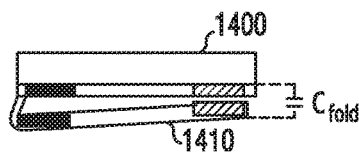

FIGS. 14A to 14C illustrate another example of implementation of an assist device according to an exemplary embodiment of the present invention. FIG. 14A illustrates a side view and front view of an open status, FIG. 14B illustrates a side view and front view of a close status, and FIG. 4C illustrates a side view and front view of a folding status.

Referring to FIGS. 14A to 14C, a cover antenna of an assist device 1410 includes a pattern1 1471, a pattern2 1472, and/or a pattern3 1473. In accordance with the status of the assist device 1410, some of the pattern1 1471, the pattern2 1472, and the pattern3 1473 can play as main patterns contributing to signal radiation, and the remnant can play as dummy patterns having no influence on the signal radiation.

Referring to FIG. 14A, in a case of the open status, the pattern1 1471 is capacitively coupled with an internal antenna of an electronic device 1400, and the pattern2 1472 and the pattern3 1473 do not contribute to signal radiation. That is, in the open status, the pattern1 1471 becomes a main pattern, and the pattern2 1472 and the pattern3 1473 become dummy patterns. For example, a resonance frequency can be formed at a low band in accordance with a stub length of the pattern1 1471. In the open status, a broadband antenna of a low band can be implemented by a combination of a resonance frequency of the internal antenna of the electronic device 1400 and a resonance frequency of the pattern1 1471.

Referring to FIG. 14B, in a case of the close status, capacitance $C_{close}$ is formed by the pattern2 1472 distributed to a first unit and second unit of the assist device 1410. Accordingly to this, the pattern2 1472 is capacitively coupled with the pattern1 1471, and the pattern1 1471 and the pattern2 1472 have influence on signal radiation. That is, in the close status, the pattern1 1471 and the pattern2 1472 become main patterns, and the pattern3 1473 becomes a dummy pattern. That is, in the open status, the pattern2 1472 has no influence, but in the close status, the pattern2 1472 can form capacitance with the front ground (e.g., bracket) of the electronic device 1400, and generate a new resonance frequency.

Referring to FIG. 14C, in a case of the folding status, capacitance $C_{fold}$ is formed by the pattern3 1473 distributed to the first unit and second unit of the assist device 1410. Accordingly to this, the pattern3 1473 is capacitively coupled with the pattern1 1471, and the pattern1 1471 and the pattern3 1473 have influence on signal radiation. That is, in the folding status, the pattern1 1471 and the pattern3 1473 become main patterns, and the pattern2 1472 becomes a dummy pattern. For example, the pattern3 1473 can form capacitance with a conductor of a rear side of the electronic device 1400, and generate a new resonance frequency depending on a concrete position of the pattern3 1473.

In the exemplary embodiment described with reference to FIG. 14, in a case of the close status illustrated in the FIG. 14B, the $C_{close}$ is formed. At this time, the $C_{fold}$ can have a value of 0, but can have any other value in accordance with cases. However, the $C_{fold}$ can be designed to have a relatively very small value compared to the $C_{close}$. That is, in a case of FIG. 14B, it can be implemented that the influence of the pattern2 1472 is dominant compared to the influence of the pattern3 1473. Likewise, in a case of FIG. 14C, the $C_{close}$ value may not be equal to 0, but it can be implemented that the influence of the pattern3 1473 is dominant compared to the influence of the pattern2 1472. For the sake of this, design factors such as areas of the patterns 1471, 1472, and 1473, an overlapped extent thereof, positions thereof in the assist device 1410, shapes thereof, lengths thereof, dielectric constants of other materials than the patterns 1471, 1472, and 1473, etc. can be taken into consideration. At this time, other components (e.g., a bracket, an LCD, a camera, etc.) of the electronic device 1400 can be more considered.

Figure 15:
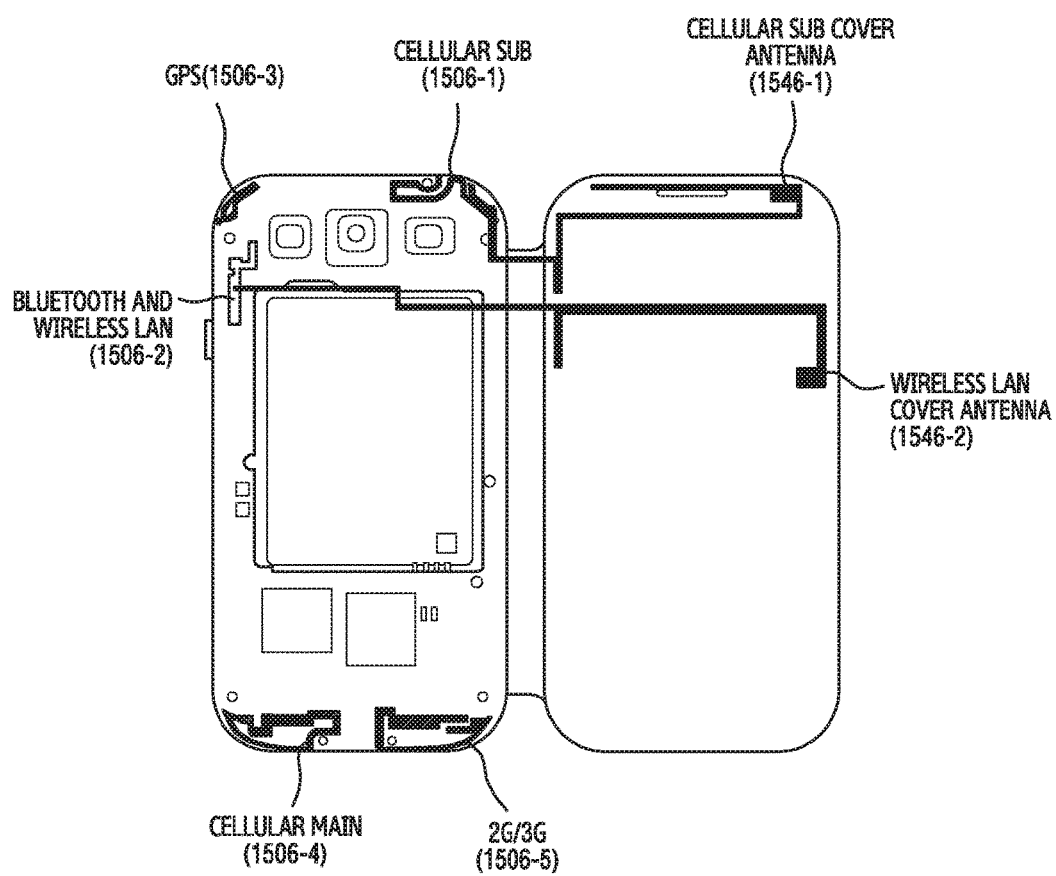
FIG. 15 illustrates a further example of implementation of an assist device according to an exemplary embodiment of the present invention.

FIG. 15 illustrates a further example of implementation of an assist device according to an exemplary embodiment of the present invention. FIG. 15 illustrates an example in which a plurality of cover antennas are implemented.

Referring to FIG. 15, the assist device includes a cellular sub cover antenna 1546-1 corresponding to a cellular sub antenna 1506-1, and a wireless LAN cover antenna 1546-2 corresponding to a wireless LAN antenna 1506-2. That is, because the electronic device can include a plurality of antennas for different bands, even the assist device can include cover antennas corresponding to respective bands. As illustrated in FIG. 15, the electronic device can further include a GPS antenna 1506-3, a cellular main antenna 1506-4, and/or a $2^{nd}$-Generation (2G)/$3^{rd}$-Generation (3G) antenna 1506-5, and even the assist device can further include corresponding cover antennas.

Figure 16A:
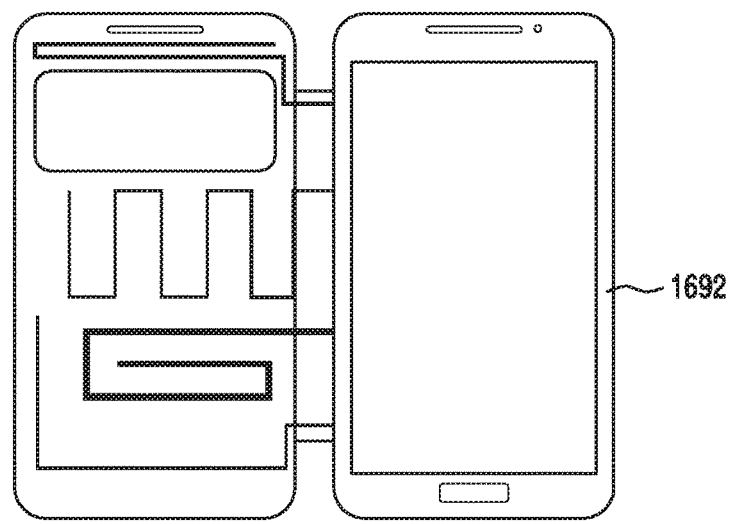
FIGS. 16A to 16C illustrate an example of use of an assist device according to an exemplary embodiment of the present invention.
Figure 16B:
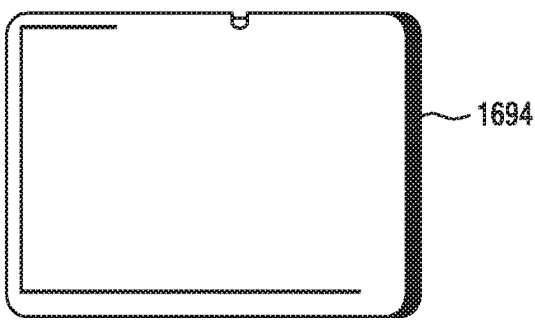
Figure 16C:
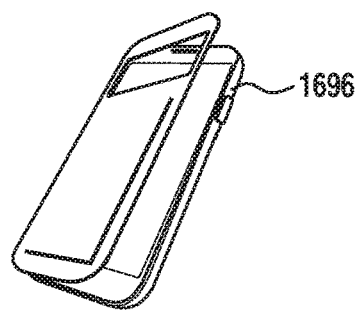

FIGS. 16A to 16C illustrate an example of use of an assist device according to an exemplary embodiment of the present invention. FIGS. 16A to 16C exemplify cover antennas applied to various platforms.

Referring to FIGS. 16A to 16C, as in FIG. 16A, an assist device according to an exemplary embodiment of the present invention is an assist device for a smart phone 1692, and can include at least one cover antenna. Also, as in FIG. 16B, the assist device according to the exemplary embodiment of the present invention is an assist device for a tablet PC 1694, and can include at least one cover antenna. Also, as in FIG. 16C, the assist device according to the exemplary embodiment of the present invention is an assist device for a tablet type smart phone 1696, and can include at least one cover antenna.

Figure 17:
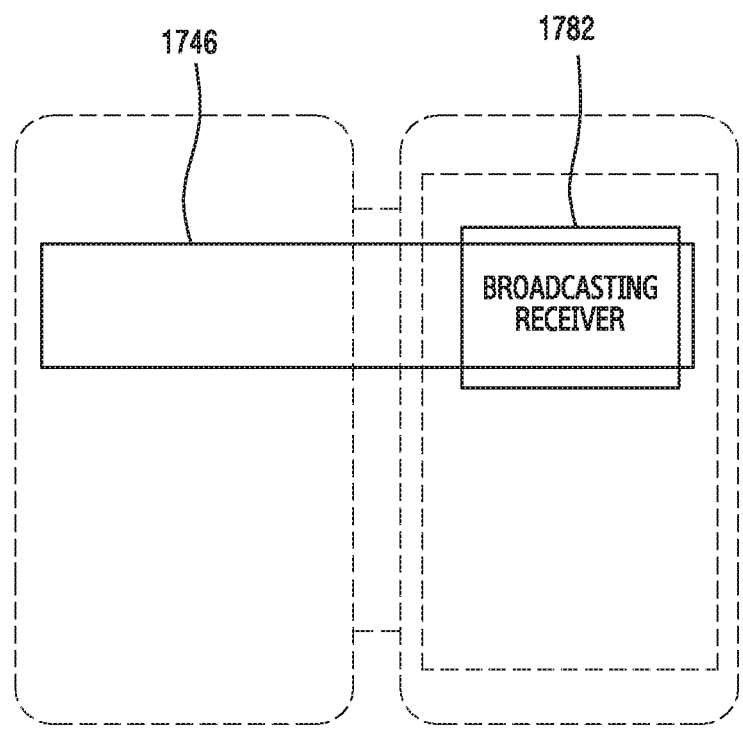
FIG. 17 illustrates another example of use of an assist device according to an exemplary embodiment of the present invention.

FIG. 17 illustrates another example of use of an assist device according to an exemplary embodiment of the present invention.

Referring to FIG. 17, the assist device can include a cover antenna 1746 for a broadcasting receiver 1782. For example, the broadcasting receiver 1782 can be a means for receiving Digital Multimedia Broadcasting (DMB), radio, etc. Generally, a broadcasting signal belongs to a low frequency band compared to a data communication signal such as cellular communication. Accordingly, because a wavelength of the broadcasting signal is relatively long, it is general that a separate external antenna is used. But, in accordance with an exemplary embodiment of the present invention, the cover antenna 1746 can instead perform a role of an external antenna. In this case, unlike a conventional external antenna, the cover antenna 1746 according to an exemplary embodiment of the present invention has the merit of not requiring physical fastening.

The broadcasting receiver 1782 operates as a means receiving a broadcasting signal and concurrently, can function as a main antenna for the broadcasting signal. In detail, the broadcasting receiver 1782 can perform a function of a feeding part enabling contact type feeding with the external antenna. Also, by forming a capacitive coupling pad pattern, the broadcasting receiver 1782 can implement non-contact type feeding with the external antenna. In more detail, the capacitive coupling pad pattern has an area of ⅟₁₀₀ or less compared to a frequency of the broadcasting signal, thereby implementing coupling in a near field.

As an antenna for the broadcasting receiver 1782, an audio output device such as an earphone including conductive materials can be used as an alternative antenna. In case where the alternative antenna such as the earphone and the cover antenna 1746 are concurrently installed, an electronic device can selectively use any one of them through a comparison of a reception sensitivity. Or, the electronic device can receive a broadcasting signal using all the both. In this case, a diversity gain can be obtained more.

Figure 18:
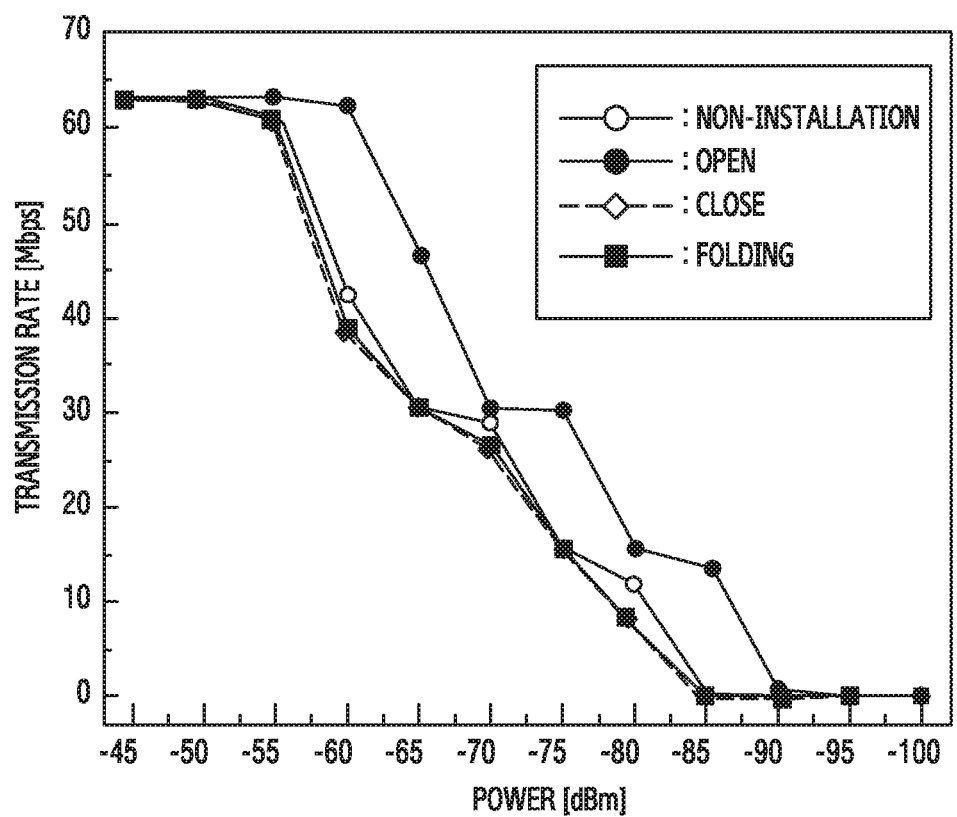
FIG. 18 illustrates antenna performance caused by an assist device according to an exemplary embodiment of the present invention.

FIG. 18 illustrates antenna performance caused by an assist device according to an exemplary embodiment of the present invention. FIG. 18 illustrates a throughput variation dependent on a transmission power. FIG. 18 illustrates the performance at application of a Multiple Input Multiple Output (MIMO) technique using a main antenna of an electronic device and a sub antenna.

Referring to FIG. 18, in a case of an open status, it is checked that the performance is improved compared to a non-installation status. Also, in a case of a close status and a folding status, it is checked that the same performance as the non-installation status is shown. That is, a cover antenna within the assist device according to an exemplary embodiment of the present invention can compensate the influence of the assist device or a user's handgrip.

Table 1 below represents a simulation result assuming bands B13, B5, B2, and B4 defined in the Long Term Evolution (LTE) standard.

TABLE 1

| | | Assist device with no cover antenna | Assist device with cover antenna | | |
| --- | --- | --- | --- | --- | --- |
| | Band | | Open status | Close status | Folding status |
| Passive efficiency | B13 reception | −14.1 dBi | +12.4 | −1.3 | −2.1 |
| | B5 reception | −13.9 dBi | +11.3 | −0.1 | +6.8 |
| | B2 reception | −4.35 dBi | +2.8 | +0.7 | −2.7 |
| | B4 reception | −5.33 dBi | +3.0 | −0.7 | +1.7 |
| Total Isotropic Sensitivity (TIS) MIMO (main + sub antenna) B13, ch 5230 | | −84.18 dBi | +5.7 | −0.2 | −1.3 |

As shown in Table 1, it is shown, according to using an assist device with a cover antenna according to an exemplary embodiment of the present invention, reception sensitivity is improved in all statuses compared to when using an assist device with no cover antenna.

In the aforementioned exemplary embodiments of the present invention, a first antenna included in a first unit of an assist device is capacitively coupled with an internal antenna included in an electronic device. In accordance with another exemplary embodiment of the present invention, the first antenna and the internal antenna can be physically coupled with each other. Below, the present invention describes exemplary embodiments in which the first antenna and the internal antenna are physically coupled with each other.

Figure 19:
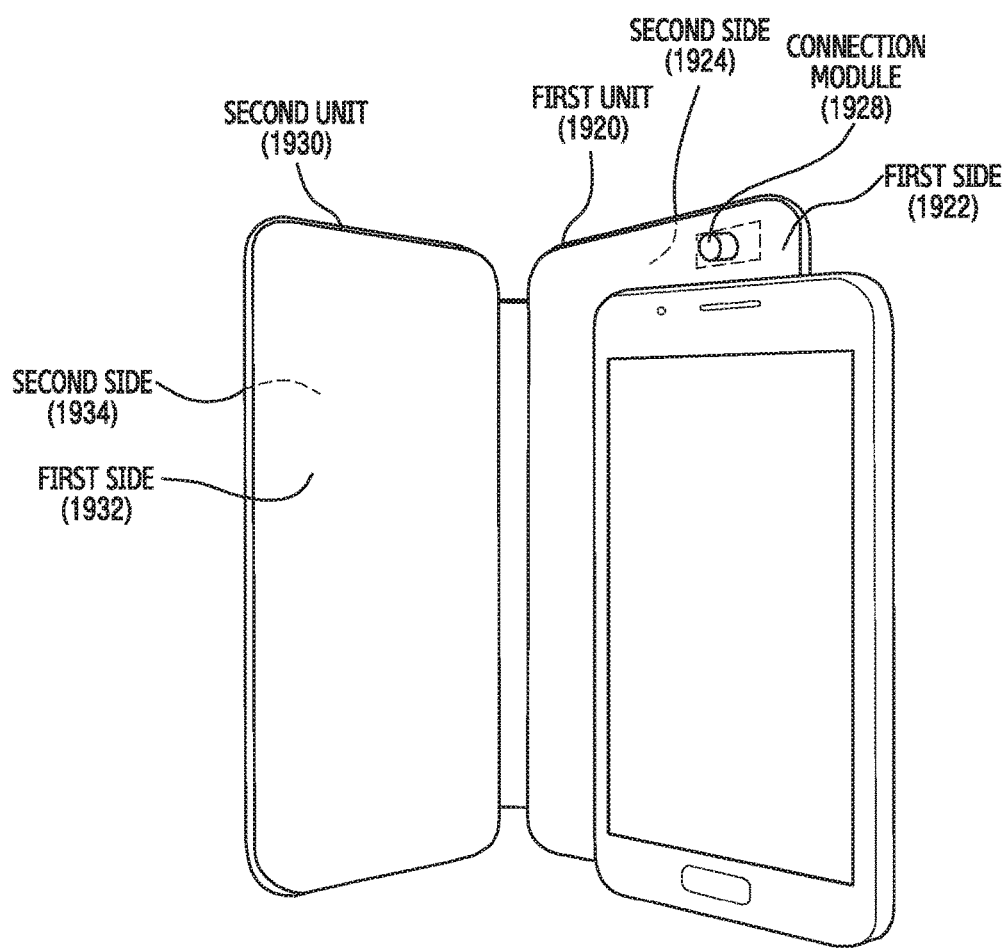
FIG. 19 illustrates an example of components of an assist device according to another exemplary embodiment of the present invention.

FIG. 19 illustrates an example of components of an assist device according to another exemplary embodiment of the present invention.

Referring to FIG. 19, the assist device consists of a first unit 1920 and a second unit 1930. The first unit 1920, a component of the assist device attached to the electronic device, can be a structure that includes a part of a component (e.g., a rear cover) of the electronic device or is independent from the electronic device. That is, so long as the assist device is not eliminated, a relative position relationship between the first unit 1920 and the electronic device is not changed. The first unit 1920 includes a first side 1922 and a second side 1924. The first side 1922, a side getting in contact with a rear side of the electronic device, can be denoted as an inner side. The second side 1924, a side opposite to the first side 1922, can be denoted as an outer side.

Also, the first unit 1920 includes a connection module 1928. The connection module 1928 is a physical fastening means between a first antenna included in the first unit 1920 and an internal antenna of the electronic device. The connection module 1928 forms inductance between the first antenna included in the first unit 1920 and the internal antenna of the electronic device. For example, the connection module 1928 can include a conductor for transmitting a signal. In FIG. 19, the connection module 1928 is positioned at a right and upper end of the first unit 1920, but in accordance with various exemplary embodiments of the present invention, the position of the connection module 1928 can be different. Also, FIG. 19 illustrates that the connection module 1928 has a cylinder shape, but in accordance with various exemplary embodiments of the present invention, the connection module 1928 can have a different shape.

The second unit 1930 is a structure independent from the electronic device. The second unit 1930 includes a first side 1932 and a second side 1934. The first side 1932, a side capable of getting in contact with a front side of the electronic device, can be denoted as an inner side. The second side 1934, a side opposite to the first side 1932, can be denoted as an outer side. The first unit 1920 and the second unit 1930 are mutually coupled with each other by means of materials having ductility or are coupled with each other through a hinge, whereby a relative position relationship between the second unit 1930 and the electronic device can be changed. Accordingly to this, the assist device can be in an open status, a close status, and/or a folding status. The statuses of the assist device can be defined as in FIG. 4 above.

Figure 20:
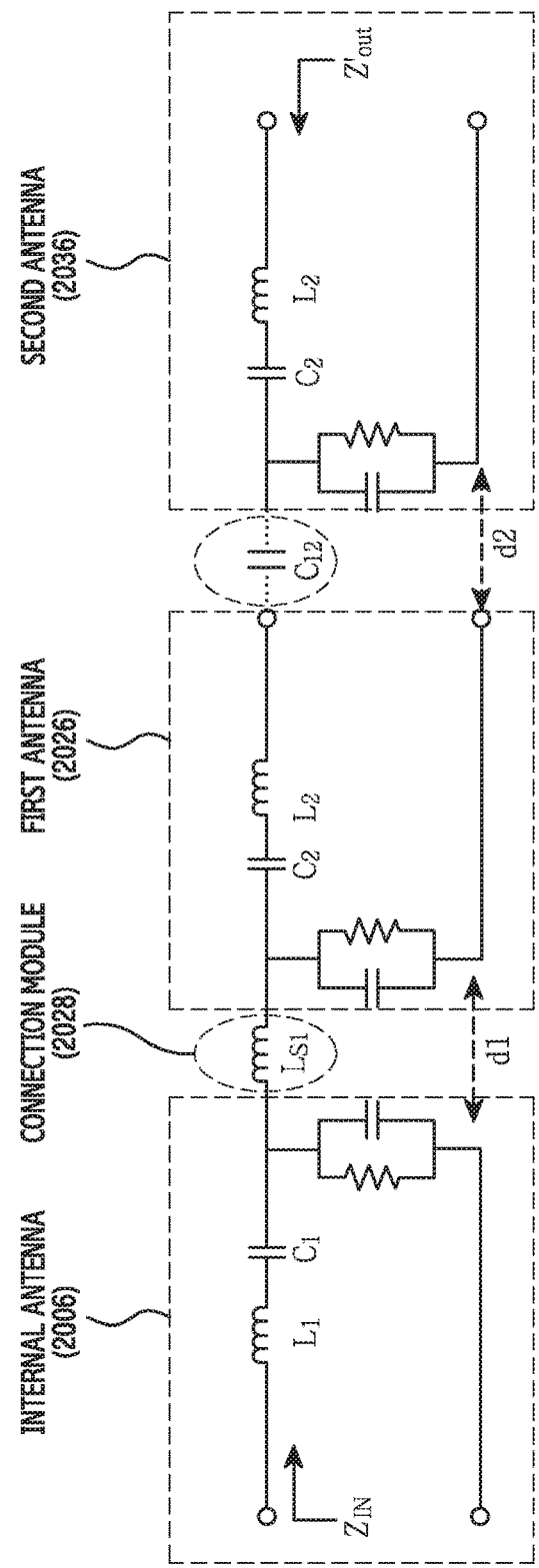
FIG. 20 illustrates an equivalent circuit of antennas included in an assist device and an electronic device according to another exemplary embodiment of the present invention.

FIG. 20 illustrates an equivalent circuit of antennas included in an assist device and an electronic device according to another exemplary embodiment of the present invention.

Referring to FIG. 20, an internal antenna 2006 and a first antenna 2026 of the assist device are physically coupled with each other by means of a connection module 2028, and the internal antenna 2006 and a second antenna 2036 of the assist device are capacitively coupled with each other. $L_{S1}$ between the internal antenna 2006 and the first antenna 2026 is an inductance value generated by the connection module 2028. The $L_{S1}$ can be maintained irrespective of a status of the assist device. $C_{12}$ between the first antenna 2026 and the second antenna 2036 is a capacitance value generated between antenna patterns physically isolated from each other, and can be changed depending on the status of the assist device. A combination of the internal antenna 2006, the first antenna 2026, and/or the second antenna 2036 can function as one antenna. The equivalent circuit of the antennas illustrated in FIG. 20 is one example. Accordingly, the antennas according to an exemplary embodiment of the present invention can be implemented in different structures.

Methods according to exemplary embodiments mentioned in claims or specification of the present invention can be implemented in a form of hardware, software, or a combination of hardware and software.

In case where the methods are implemented by software, a computer-readable storage medium storing one or more programs (software modules) can be provided. The one or more programs stored in the computer-readable storage medium are configured to be executed by one or more processors within an electronic device. The one or more programs include instructions for enabling the electronic device to execute the methods according to the exemplary embodiments stated in the claims or specification of the present invention.

This program (software module, software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or an optical storage device of another form, a magnetic cassette. Or, the program can be stored in a memory constructed by a combination of some or all of them. Also, each constructed memory may be included in plural as well.

Further, the program can be stored in an attachable storage device accessible through a communication network such as the Internet, an intranet, a LAN, a Wide LAN (WLAN) and a Storage Area Network (SAN), or a communication network constructed by a combination of them. This storage device can connect to a device performing an exemplary embodiment of the present invention through an external port. Also, a separate storage device on the communication network can connect to a device performing an exemplary embodiment of the present invention as well.

In the aforementioned concrete exemplary embodiments of the present invention, components included in the invention have been expressed in the singular form or the plural form in accordance to a proposed concrete exemplary embodiment. However, for description convenience, the expression of the singular form or plural form is selected suitable to a proposed situation, and the present invention is not limited to singular or plural components. Even a component expressed in the plural form can be constructed in the singular form, or even a constituent element expressed in the singular form can be constructed in the plural form.

While a concrete exemplary embodiment has been described in a detailed description of the present invention, it is undoubted that various modifications are available without departing from the scope of the present invention. Therefore, the scope of the present invention should not be limited and defined by the described exemplary embodiment, and should be defined by not only the scope of claims described later but also equivalents to the scope of claims.

What is claimed is:

1. An assist apparatus for an electronic device having an antenna, the assist apparatus comprising
    a second surface including a second antenna,
    wherein the second antenna is configured to generate a capacitance with at least one of a first antenna in a first surface and an internal antenna of the electronic device, and
    wherein a value of the capacitance is changed depending on a relative position change of the second surface with respect to the first surface.

2. The assist apparatus of claim 1, wherein the first surface is in the assist apparatus or the electronic device.

3. The assist apparatus of claim 1, wherein the first antenna is capacitively or inductively coupled with the internal antenna.

4. The assist apparatus of claim 1, wherein the first surface comprises a connection module physically coupling the internal antenna and the first antenna.

5. The assist apparatus of claim 4, wherein the connection module is configured to generate an inductance between the internal antenna and the first antenna.

6. The assist apparatus of claim 1, wherein the relative position change is classified into an open status, a close status, and a folding status,
    wherein the close status is a status in which the second surface is in contact with a front side of the electronic device,
    wherein the folding status is a status in which the second surface is in contact with a rear side of the electronic device or a rear cover of the electronic device or the first surface of the assist apparatus, and
    wherein the open status is a status other than the close status and the folding status.

7. The assist apparatus of claim 6, wherein the first antenna comprises a first pattern that is capacitively coupled with the internal antenna in the open status, the close status, and the folding status.

8. The assist apparatus of claim 6, wherein the second antenna comprises a second pattern that is capacitively coupled with at least one of the first antenna and the internal antenna in the close status, and a third pattern that is capacitively coupled with at least one of the first antenna and the internal antenna in the folding status.

9. The assist apparatus of claim 1, wherein the second antenna comprises at least one pattern that in accordance with the relative position change, is capacitively coupled with at least one of the first antenna and the internal antenna or is operated as a dummy pattern.

10. The assist apparatus of claim 1,
    wherein the first antenna comprises a first pattern,
    the second antenna comprises a second pattern and a third pattern,
    the first pattern and the second pattern generate a capacitance of a first value in a first status of the assist apparatus, and
    the first pattern and the third pattern generate a capacitance of a second value in a second status of the assist apparatus.

11. The assist apparatus of claim 1, wherein the first antenna and the second antenna generate a capacitance for compensating an antenna resonance point variation caused by components other than the first antenna and the second antenna of the assist apparatus and a user's handgrip.

12. The assist apparatus of claim 1, wherein, in case that the relative position change is an open status, a resonance frequency of an entire antenna comprising the internal antenna, the first antenna, and the second antenna is the same as a resonance frequency of the internal antenna of when the assist apparatus is not installed.

13. The assist apparatus of claim 1, wherein, in case that the relative position change is an open status, a resonance frequency of an entire antenna comprising the internal antenna, the first antenna, and the second antenna is lower than a resonance frequency of the internal antenna of when the assist apparatus is not installed.

14. The assist apparatus of claim 1, wherein, in case that the second surface is in contact with a front side or rear side of the electronic device, a resonance frequency of an entire antenna comprising the internal antenna, the first antenna, and the second antenna is higher than a resonance frequency of the internal antenna of when the assist apparatus is not installed.

15. The assist apparatus of claim 1, wherein the internal antenna comprises at least one of an antenna for data communication and a circuit for broadcasting reception.

16. The assist apparatus of claim 15, wherein the antenna for the data communication comprises at least one of a main antenna for cellular communication, a sub antenna for the cellular communication, an antenna for Wireless Local Area Network (WLAN), and an antenna for Global Positioning System (GPS).

17. The assist apparatus of claim 1, wherein the assist apparatus is a cover for the electronic device.

18. An electronic device comprising:
    an internal antenna; and
    a first surface that includes a first antenna; and a second surface that includes a second antenna,
wherein the second antenna is configured to generate capacitance with at least one of the first antenna and the internal antenna,
wherein a value of the capacitance is changed depending on a relative position change of the second surface with respect to the first surface the second surface.

19. The electronic device of claim 18, wherein the second antenna comprises at least one pattern that in accordance with the relative position change, is capacitively coupled with at least one of the first antenna and the internal antenna or is operated as a dummy pattern.

20. The electronic device of claim 18, wherein the first antenna comprises a first pattern,
the second antenna comprises a second pattern and a third pattern,
the first pattern and the second pattern generate a capacitance of a first value in a first status of the first surface and the second surface, and
the first pattern and the third pattern generate a capacitance of a second value in a second status of the first surface and the second surface.

\* \* \* \* \*